(12) United States Patent
Zhu et al.

(10) Patent No.: US 12,007,587 B2
(45) Date of Patent: Jun. 11, 2024

(54) GRATING, GRATING DRIVING METHOD AND 3D DISPLAY DEVICE

(71) Applicant: BOE TECHNOLOGY GROUP CO., LTD., Beijing (CN)

(72) Inventors: Jinye Zhu, Beijing (CN); Sen Ma, Beijing (CN); Zhichong Wang, Beijing (CN); Tao Hong, Beijing (CN); Junxing Yang, Beijing (CN); Jing Yu, Beijing (CN); Tianyang Han, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 218 days.

(21) Appl. No.: 17/435,312

(22) PCT Filed: Nov. 18, 2020

(86) PCT No.: PCT/CN2020/129656
§ 371 (c)(1),
(2) Date: Aug. 31, 2021

(87) PCT Pub. No.: WO2022/104575
PCT Pub. Date: May 27, 2022

(65) Prior Publication Data
US 2022/0236585 A1   Jul. 28, 2022

(51) Int. Cl.
*G02B 30/31* (2020.01)
*G02F 1/133* (2006.01)
*G02F 1/1343* (2006.01)

(52) U.S. Cl.
CPC ......... *G02B 30/31* (2020.01); *G02F 1/13306* (2013.01); *G02F 1/134309* (2013.01)

(58) Field of Classification Search
None
See application file for complete search history.

(56) References Cited

U.S. PATENT DOCUMENTS

2011/0157171 A1   6/2011  Lin
2013/0229587 A1*  9/2013  Takama ................. G02F 1/137
                                                                  349/138

(Continued)

FOREIGN PATENT DOCUMENTS

CN   202939389 U   5/2013
CN   202948226 U   5/2013

(Continued)

*Primary Examiner* — Ryan Crockett
(74) *Attorney, Agent, or Firm* — Muncy, Geissler, Olds & Lowe, P.C.

(57) ABSTRACT

The present disclosure provides a grating including: a first substrate including stacked first and second electrode layers each including strip-shaped electrodes with an identical width, strip-shaped electrodes in the first and second electrode layers arranged alternately; a second substrate opposite to the first substrate with a liquid crystal layer therebetween; driving modules for driving the strip-shaped electrodes to form light shading parts and light transmission parts, one light shading part and one adjacent light transmission part defining a grating unit, at least one grating unit defining a grating part, the driving modules arranged in one-to-one correspondence with the grating parts; and a control module for generating driving signals in one-to-one correspondence with the driving modules according to a distance between the human eyes and the grating, thereby changing a width of the grating unit corresponding to a crosstalk position. A 3D display device and a grating driving method are provided.

15 Claims, 6 Drawing Sheets

(56) References Cited

U.S. PATENT DOCUMENTS

| | | | | |
|---|---|---|---|---|
| 2014/0036173 | A1* | 2/2014 | Chang | G02B 30/27 |
| | | | | 349/15 |
| 2014/0118824 | A1 | 5/2014 | Hsieh et al. | |
| 2014/0375778 | A1* | 12/2014 | Miao | H04N 13/366 |
| | | | | 348/51 |
| 2015/0316778 | A1* | 11/2015 | Smith | G02B 30/27 |
| | | | | 349/33 |
| 2016/0198150 | A1 | 7/2016 | Meng et al. | |
| 2016/0274372 | A1* | 9/2016 | Tian | H04N 13/31 |
| 2018/0107089 | A1 | 4/2018 | Zhao et al. | |
| 2018/0149877 | A1* | 5/2018 | Lu | H04N 13/315 |
| 2019/0335163 | A1* | 10/2019 | Yang | G02B 30/31 |
| 2020/0018983 | A1 | 1/2020 | Wu et al. | |
| 2020/0183182 | A1* | 6/2020 | Yang | H04N 13/376 |

FOREIGN PATENT DOCUMENTS

| | | |
|---|---|---|
| CN | 104155824 A | 11/2014 |
| CN | 104252058 A | 12/2014 |
| CN | 105954956 A | 9/2016 |
| CN | 107515474 A | 12/2017 |
| CN | 206833113 U | 1/2018 |
| CN | 108572489 A | 9/2018 |
| CN | 108614369 A | 10/2018 |
| CN | 109387984 A | 2/2019 |
| CN | 110095871 A | 8/2019 |

* cited by examiner

--Prior Art--

GRATING, GRATING DRIVING METHOD AND 3D DISPLAY DEVICE

CROSS-REFERENCE TO RELATED APPLICATION

The present application is the U.S. national phase of PCT Application No. PCT/CN2020/129656 filed on Nov. 18, 2020, which is incorporated herein by reference in its entirety.

TECHNICAL FIELD

The present disclosure relates to the technical field of 3D display product manufacturing technologies, and in particular to a grating, a grating driving method and a 3D display device.

BACKGROUND

Grating-type naked eye 3D technology has become an important direction of naked eye 3D technologies due to its simple manufacturing process and better 3D effect. Conventional variable gratings have optimal viewing distances at which left and right eyes can see corresponding left and right views, respectively, with less crosstalk and optimal 3D effect. However, when the human eyes deviate from the optimal viewing distance, that is, the human eyes move forward and backward with respect to a screen, the human eyes cannot independently see the corresponding views, which results in a significant increase in crosstalk and poor 3D effects.

SUMMARY

In order to solve the foregoing technical problems, the present disclosure provides a grating, a grating driving method and a 3D display device, which can solve the problem of large crosstalk when the human eyes move forward and backward with respect to the screen.

In order to achieve the foregoing object, embodiments of the present disclosure adopt the following technical solution: a grating including: a first substrate; wherein the first substrate includes a first electrode layer and a second electrode layer stacked on the first electrode layer, each of the first electrode layer and the second electrode layer includes a plurality of strip-shaped electrodes with an identical width, and the strip-shaped electrodes in the first electrode layer and the strip-shaped electrodes in the second electrode layer are arranged alternately; a second substrate oppositely arranged with respect to the first substrate; a liquid crystal layer between the first substrate and the second substrate; a plurality of driving modules configured to drive the plurality of the strip-shaped electrodes to enable liquid crystals to be deflected to form light shading parts and light transmission parts; wherein a grating unit is defined by one light shading part and one adjacent light transmission part, a grating part is defined by at least one grating unit, the plurality of driving modules are arranged in one-to-one correspondence with the grating parts; and a control module configured to generate a plurality of driving signals in one-to-one correspondence with the plurality of the driving modules according to a distance between the human eyes and the grating, thereby changing a width of the grating unit corresponding to a crosstalk position, and enabling each light transmission part in the grating part corresponding to the crosstalk position to move close to or away from a center of the grating.

Optionally, when the grating part includes at least two grating units, the strip-shaped electrodes at the same position in different grating units of the same grating part share an identical driving signal line.

Optionally, the control module includes:
a first control unit configured to obtain a corresponding relationship between a grating driving parameter and a distance between human eyes and a grating; wherein the grating driving parameter includes a grating unit corresponding to the crosstalk position and a width of the grating unit corresponding to the crosstalk position;
a second control unit configured to determine a current distance between the human eyes and the grating;
a third control unit configured to, when the current distance between the human eyes and the grating is outside an optimal viewing distance, according to the corresponding relationship and the current distance between the human eyes and the grating, obtain a grating driving parameter corresponding to the current distance; and
a fourth control unit configured to, according to the grating driving parameter corresponding to the current distance, generate a corresponding driving signal for changing a width of the grating unit corresponding to the crosstalk position, and moving each light transmission part in the grating part corresponding to the crosstalk position close to or away from a center of the grating.

Optionally, the first control unit includes a first control sub-unit configured to obtain a first distance that the human eyes are able to move in a direction perpendicular to a display screen with respect to the optimal viewing distance according to the following formulas:

$$AP = h * \frac{PO}{QB - PO};$$

the optimal viewing distance
when moving to a point C close to the display screen in a direction perpendicular to the display screen, a distance between the human eyes and the grating 10 is $$CP = h * \frac{PR}{QB - PO};$$

when moving to a point C away from the display screen in a direction perpendicular to the display screen, a distance between the human eyes and the grating 10 is $$EP = h * \frac{PS}{QB - PO};$$
$$PR = PO - RO;$$
$$PS = PO + OS;$$

wherein "h" represents a distance between the grating and the display screen; a point P is an intersection point of an optimal viewing point A to a vertical line of the grating; a point O represents a position of a grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one strip-shaped electrode.

Optionally, the first control unit further includes a second sub-control unit configured to, when RO or OS is a width of at least two strip-shaped electrodes, according to the first distance obtained by the first sub-control unit, obtain a grating driving parameter with the following formulas:

$$PK = PL - KL;$$

$$QD = QB + BD;$$

$$PT = PL + LT;$$

$$QF = QB + FB;$$

$$PL = m * w;$$

$$\frac{AP}{AP+h} = \frac{PL}{QG} = \frac{PO}{QB};$$

$$\frac{CP}{CP+h} = \frac{PK}{QG} = \frac{PR}{QD};$$

$$\frac{EP}{EP+h} = \frac{PT}{QG} = \frac{PS}{QF};$$

wherein "m" represents a position of an m-th grating unit in a direction from an edge of the grating to a center of the grating; "w" represents a width of the grating unit; a point L represents a position of a grating unit corresponding to a sub-pixel G on the display screen, which is viewed when the human eyes are at the point A; KL represents a width of at least one strip-shaped electrode; and LT represents a width of at least one strip-shaped electrode.

Optionally, the number n of the corresponding stripe-shaped electrodes in each grating unit is obtained by the following formulas:

a width W of the grating unit is obtained by the following formula:

$$W = \frac{H * N * P}{h * M};$$

$$h = p * H/L;$$

$$n = W/a;$$

wherein "a" represents a width of each strip-shaped electrode; "H" represents an optimal viewing distance between the human eyes and the grating; "h" represents a distance between the grating and the display screen; "N" represents the number of sub-pixels of the display screen; "P" represents a width of the sub-pixel; "M" represents the number of grating units; and "L" represents a pupillary distance.

Optionally, the width of each of the strip electrodes is in a range from 0.9 to 3 um.

Optionally, the control module further includes:

a fifth control unit configured to determine an offset direction and an offset distance of the human eyes with respect to the optimal viewing position in a direction parallel to a line of centers of the human eyes; and a sixth control unit configured to, according to the offset direction and the offset distance of the human eyes, determine an offset direction and an offset distance of the light transmission part of the grating with respect to the position of the light transmission part when the human eyes are at the optimal viewing position.

One embodiment of the present disclosure further provides a grating driving method applied to the foregoing grating, including:

obtaining a corresponding relationship between a grating driving parameter and a distance between human eyes and a grating; wherein the grating driving parameter includes a grating unit corresponding to a crosstalk position and a width of the grating unit corresponding to the crosstalk position;

determining a current distance between the human eyes and the grating;

when the current distance between the human eyes and the grating is outside an optimal viewing distance, according to the corresponding relationship and the current distance between the human eyes and the grating, obtaining a grating driving parameter corresponding to the current distance; and according to the grating driving parameter corresponding to the current distance, generating a corresponding driving signal for changing a width of the grating unit corresponding to the crosstalk position, and moving each light transmission part in the grating part corresponding to the crosstalk position close to or away from a center of the grating.

Optionally, the obtaining a corresponding relationship between a grating driving parameter and a distance between human eyes and a grating, includes:

obtaining a first distance that the human eyes are able to move in a direction perpendicular to a display screen with respect to the optimal viewing distance according to the following formulas:

the optimal viewing distance $$AP = h * \frac{PO}{QB - PO};$$

when moving to a point C close to the display screen in a direction perpendicular to the display screen, a distance between the human eyes and the grating is $$CP = h * \frac{PR}{QB - PO};$$

when moving to a point C away from the display screen in a direction perpendicular to the display screen, a distance between the human eyes and the grating 10 is $$EP = h * \frac{PS}{QB - PO};$$

$$PR = PO - RO;$$

$$PS = PO + OS;$$

wherein "h" represents a distance between the grating and the display screen; a point P is an intersection point of an optimal viewing point A to a vertical line of the grating; a point O represents a position of a grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one strip-shaped electrode.

Optionally, the obtaining a corresponding relationship between a grating driving parameter and a distance between human eyes and a grating, further includes:

when RO or OS is a width of at least two strip-shaped electrodes, according to the first distance obtained by the first sub-control unit, obtaining a grating driving parameter with the following formulas:

$$PK = PL - KL;$$

$$QD = QB + BD;$$

$$PT = PL + LT;$$

$$QF = QB + FB;$$

$$PL = m * w;$$

$$\frac{AP}{AP+h} = \frac{PL}{QG} = \frac{PO}{QB};$$

$$\frac{CP}{CP+h} = \frac{PK}{QG} = \frac{PR}{QD};$$

$$\frac{EP}{EP+h} = \frac{PT}{QG} = \frac{PS}{QF};$$

wherein "m" represents a position of an m-th grating unit in a direction from an edge of the grating to a center of the grating; "w" represents a width of the grating unit; a point L represents a position of a grating unit corresponding to a sub-pixel G on the display screen, which is viewed when the human eyes are at the point A; KL represents a width of at least one strip-shaped electrode; and LT represents a width of at least one strip-shaped electrode.

Optionally, the grating driving method further includes:

determining an offset direction and an offset distance of the human eyes with respect to the optimal viewing position in a direction parallel to a line of centers of the human eyes; and according to the offset direction and the offset distance of the human eyes, determining an offset direction and an offset distance of the light transmission part of the grating with respect to the position of the light transmission part when the human eyes are at the optimal viewing position.

One embodiment of the present disclosure provides a 3D display device including a display screen and the foregoing grating at a light-exiting side of the display screen.

Advantageous effects of the present disclosure are as follows: the strip-shaped electrodes in each grating part are independently driven, when the human eyes move forward and backward, different driving signals are generated to drive corresponding strip-shaped electrodes, thereby changing a width of the grating unit at the crosstalk position and then reducing the crosstalk.

DETAILED DESCRIPTION

Figure 1:
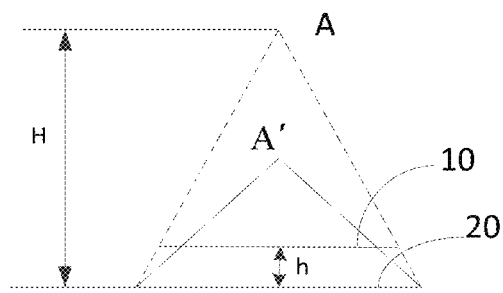
FIG. 1 is a schematic diagram showing changes of a grating when human eyes move forward.
Figure 2:
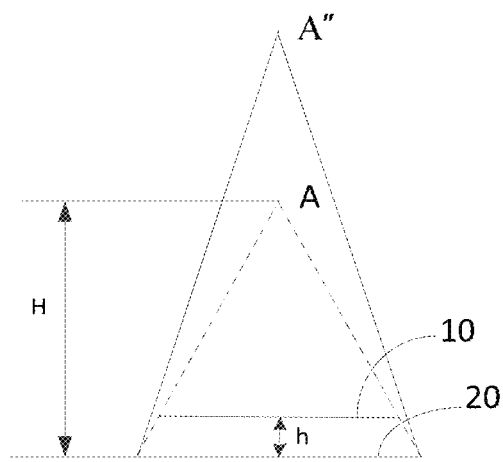
FIG. 2 is a schematic diagram showing changes of a grating when human eyes move backward.

In order to make objects, technical solutions and advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

In the description of the present disclosure, it should be noted that orientation or positional relationship indicated by terms such as "center", "upper", "lower", "left", "right", "vertical", "horizontal", "inner" and "outer", is based on orientation or positional relationship shown in the drawings, and is only for convenience of describing the present disclosure and simplifying the description, and does not indicate or imply that a pointed device or element must have a specific orientation or be constructed and operated in a particular orientation, and therefore should not be construed as a limitation of the present disclosure. In addition, terms such as "first", "second" and "third" are only used for descriptive purposes, and cannot be construed as indicating or implying relative importance.

As shown in FIG. 1, H is an optimal viewing distance. When human eyes move forward close to a display screen 20, i.e., moving from a point A to a point A', a width of a grating 10 becomes smaller. As shown in FIG. 1, when the human eyes move backward away from the display screen 20, i.e., moving from a point A to a point A", the width of the grating 10 becomes larger.

Figure 3:
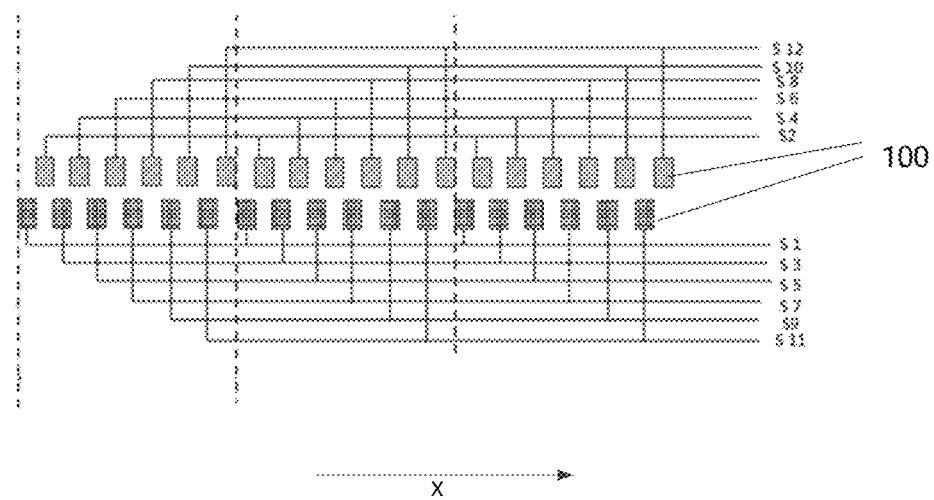
FIG. 3 is a schematic diagram of a grating driving circuit in the related art.

As shown in FIG. 3, in the related art, a grating includes a plurality of grating units. Each grating unit includes a plurality of strip-shaped electrodes 100, and a plurality of driving signal lines for providing a voltage to each strip-shaped electrode 100 to form a light transmission part and a light shading part. The strip-shaped electrodes 100 are evenly divided into groups and driven in groups, that is, the strip-shaped electrodes 100 at the same position in the plurality of the grating units share a driving signal line. For example, as shown in FIG. 3, a region between two adjacent dotted lines is a grating unit, and a first strip-shaped electrode along an X direction in each of the grating units is connected to a driving signal line S1. However, such a driving mode cannot realize width transformation of an individual grating unit and then it is difficult to reduce crosstalk when the human eyes move forward and backward, resulting in poor 3D display effect.

In view of the foregoing problems, one embodiment provides a grating including: a first substrate, a second substrate which is oppositely arranged with respect to the first substrate, a liquid crystal layer between the first substrate and the second substrate, a plurality of driving modules and a control module. The first substrate includes a first electrode layer and a second electrode layer tacked on the first electrode layer. Each of the first electrode layer and the second electrode layer includes a plurality of strip-shaped electrodes with an identical width. The strip-shaped electrodes in the first electrode layer and the strip-shaped electrodes in the second electrode layer are arranged alternately.

The plurality of driving modules are configured to drive the plurality of the strip-shaped electrodes to enable the liquid crystal to be deflected to form a light shading part and a light transmission part. A grating unit is defined by one light shading part and one adjacent light transmission part. One a grating part is defined by at least one grating unit. The plurality of driving modules are arranged in one-to-one correspondence with the plurality of the grating parts.

The control module is configured to generate a plurality of driving signals in one-to-one correspondence with the plurality of the driving modules according to a distance between the human eyes and the grating, thereby changing a width of the grating unit corresponding to a crosstalk position, and enabling each light transmission part in the grating part corresponding to the crosstalk position to move close to or away from a center of the grating.

In this embodiment, for example, when the grating part includes one grating unit, each grating unit is independently driven. When the human eyes move forward and backward, different driving signals are generated to drive corresponding strip-shaped electrodes, thereby increasing or decreasing a width of the grating unit at the crosstalk position while not changing a width of the grating unit which is not at the crosstalk position, and then reducing the crosstalk. In this embodiment, for example, when the grating part includes at least two grating units, strip-shaped electrodes at the same position in different grating units of an identical grating part share an identical driving signal line. For example, when the strip-shaped electrodes corresponding to each grating unit are numbered 1, 2, 3 . . . n in a direction away from the center of the grating, strip-shaped electrodes with the same number in different grating units within the same grating part share the same driving signal line.

Figure 10:
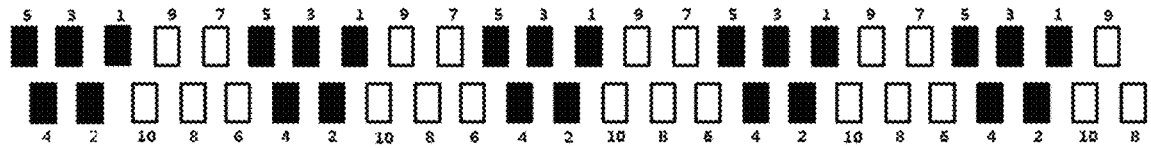
FIG. 10 is a schematic diagram showing states of some strip-shaped electrodes corresponding to an optimal viewing distance according to an embodiment of the present disclosure.
Figure 11:
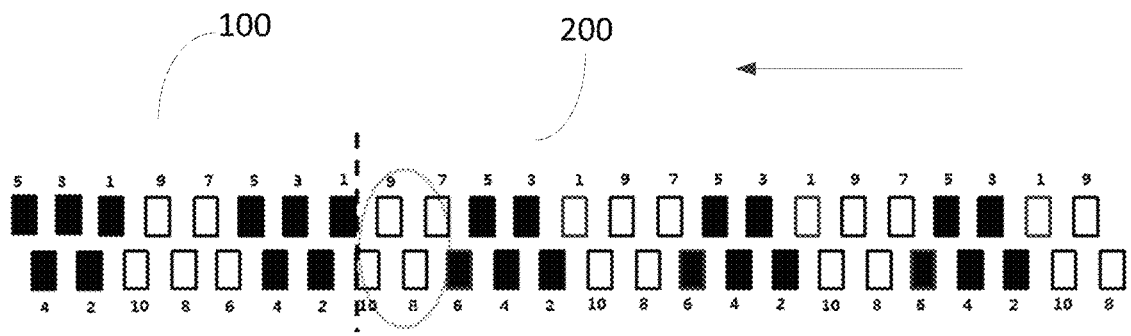
FIG. 11 is a first schematic diagram showing states of some strip-shaped electrodes after compensation according to an embodiment of the present disclosure.

In fact, a movement range of the human eyes moving in a direction away from or close to the grating is limited; when the human eyes move in the direction away from or close to the grating and then deviate from an optimal viewing distance, crosstalk is not generated at a position corresponding to each grating unit, and thus each grating unit is independently driven, which will increase the number of wirings and increase the cost. In this embodiment, the grating is partitioned according to the position where crosstalk occurs, and the grating part is taken as a minimum driving unit to perform independent driving so that in each grating unit within the same grating part, strip-shaped electrodes located at the same position share the same driving signal line. Referring to FIG. 10 and FIG. 11, FIG. 10 shows states of a light transmission part and a light shading part in a grating when the human eyes are located at an optimal viewing distance, and FIG. 11 shows states of the light transmission part and the light shading part in the grating when the human eyes move in a direction close to the grating. A region at a right side of a dotted line in FIG. 11 represents a partial region of one grating part, and there are three complete light transmission parts and three complete light shading parts in this region, that is, there are three grating units in this region. The strip-shaped electrodes in each grating unit are numbered, and strip-shaped electrodes with the same number in different grating units share a driving signal line. In comparison between FIG. 10 and FIG. 11, the strip-shaped electrode with the number 6 is changed from forming a light transmission part to forming a light shading part, and the strip-shaped electrode with the number 1 is changed from forming a light shading part to forming a light transmission part, so that a width of a grating unit corresponding to a crosstalk position is decreased. That is, as shown by a circle in FIG. 11, the number of the strip-shaped electrodes that form a light transmission part is reduced by one, and the light transmission parts at remaining positions are shift to the left as a whole.

When the human eyes move forward and backward, with respect to grating parameters when the human eyes are located at the optimal viewing distance, the width of the grating unit corresponding to the crosstalk position is changed, while the width of the grating unit corresponding to a non-crosstalk position is unchanged, so that the light transmission parts of the grating as a whole move close to the center of the grating as the human eyes move forward, and the light transmission parts of the grating as a whole move away from the center of the grating center as the human eyes move backward, thereby reducing crosstalk.

In this embodiment, all the strip-shaped electrodes has an identical width. An orthographic projection of one strip-shaped electrode in the first electrode layer onto the second electrode layer completely covers a gap between two adjacent strip-shaped electrodes in the second electrode layer, so that the first electrode layer and the second electrode layer cover an entire display area of the display screen. Specifically, the strip-shaped electrodes in the first electrode layer may partially overlap or not overlap the strip-shaped electrodes in the second electrode layer in a direction perpendicular to the first substrate.

In this embodiment, for example, the control module includes:

a first control unit configured to obtain a corresponding relationship between a grating driving parameter and a distance between human eyes and a grating; where the grating driving parameter includes a grating unit corresponding to a crosstalk position and a width of the grating unit corresponding to the crosstalk position;

a second control unit configured to determine a current distance between the human eyes and the grating;

a third control unit configured to, when the current distance between the human eyes and the grating is outside the optimal viewing distance, according to the corresponding relationship and the current distance between the human eyes and the grating, obtain a grating driving parameter corresponding to the current distance; and a fourth control unit configured to, according to the grating driving parameter corresponding to the current distance, generate a corresponding driving signal for changing a width of the grating unit corresponding to the crosstalk position, and moving each light transmission part in the grating part corresponding to the crosstalk position close to or away from a center of the grating.

It should be noted that in a case that the human eyes move back and forth, only when a to-be-compensated width of the grating unit corresponding to the crosstalk position is an integer multiple of the width of the strip-shaped electrode, crosstalk compensation can be performed to change the width of the corresponding grating unit thereby reducing crosstalk. Therefore, it is necessary to first determine a position where the human eye can move, then determine a position of the strip-shaped electrode corresponding to the crosstalk position, which needs to be compensated, and determine a shift direction of the light transmission parts of the grating as a whole according to a movement direction of the human eyes, i.e. adjusting the first strip-shaped electrode corresponding to the crosstalk position from forming a light shading part to forming a light transmission part, or adjusting the first stripe-shaped electrode corresponding to the crosstalk position from forming a light transmission part to forming a light shading part.

Figure 4:
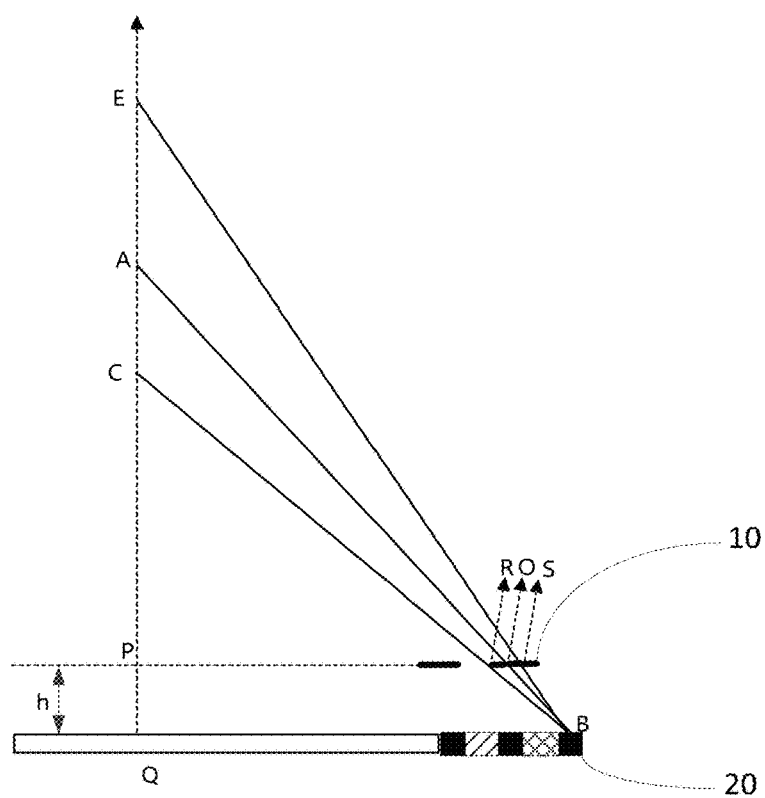
FIG. 4 is a schematic diagram showing a principle of determining a first distance according to an embodiment of the present disclosure.

Referring to FIG. 4, in an implementation of the present embodiment, the first control unit includes a first control sub-unit configured to obtain a first distance that the human eyes are able to move in a direction perpendicular to the display screen 20 with respect to the optimal viewing distance according to the following formulas:

the optimal viewing distance $$AP = h * \frac{PO}{QB - PO};$$

when moving to a point C close to the display screen in a direction perpendicular to the display screen 20, a distance between the human eyes and the grating 10 is $$CP = h * \frac{PR}{QB - PO};$$

when moving to a point C away from the display screen in a direction perpendicular to the display screen 20, a distance between the human eyes and the grating 10 is $$EP = h * \frac{PS}{QB - PO};$$
$$PR = PO - RO;$$
$$PS = PO + OS;$$

where "h" represents a distance between the grating 10 and the display screen 20; a point P is an intersection point of an optimal viewing point A to a vertical line of the grating; a point O represents a position of the grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one stripe-shaped electrode.

Since only when the human eyes move forward or backward by a certain distance so that the change in the width of the grating unit corresponding to the crosstalk position achieves the width of one strip-shaped electrode, the corresponding strip-shaped electrode is compensated to achieve the effect of reducing the crosstalk. Thus, in order to increase the movement distance of the human eye in the direction perpendicular to the display screen to view a clear 3D image, the width of each stripe-shaped electrode may be decreased so as to reduce a minimum distance that the human eyes can offset in a direction perpendicular to the display screen with respect to the optimal viewing point, thereby increasing positions where the human eyes can move. In an implementation of the present embodiment, the width of each stripe-shaped electrode is in a range from 0.9 to 3 um, but not limited thereto.

In this embodiment, the number n of the corresponding stripe-shaped electrodes in each grating unit is obtained by the following formula:

width W of the grating unit is obtained by the following formula:

$$W = \frac{H * N * P}{h * M};$$
$$h = p * H/L;$$
$$n = W/a;$$

where "a" represents a width of each strip-shaped electrode; "H" represents an optimal viewing distance between the human eyes and the grating; "h" represents a distance between the grating and the display screen; "N" represents the number of sub-pixels of the display screen; "P" represents a width of the sub-pixel; "M" represents the number of grating units; and "L" represents a pupillary distance.

In an implementation of this embodiment, for a 5.7-in display screen, "L" is 65 mm, "H" is 300 mm, "P" is 32.85 um, the number of viewpoints is 3, the number of viewpoints is obtained by the formula N/M, the pixel resolution is 3840*1080, a width of the grating unit is 98.5 um, and an aperture ratio of the grating is 20%; the number of strip-shaped electrodes corresponding to each grating unit is 66, the first electrode layer includes 33 strip-shaped electrodes and the second electrode layer includes 33 strip-shaped electrodes, and there are a total of 1280 grating units for the 5.7-in display screen. By specifying the number of strip-shaped electrodes corresponding to each grating unit, it can facilitate subsequent changes of driving of a certain strip-shaped electrode.

Figure 5:
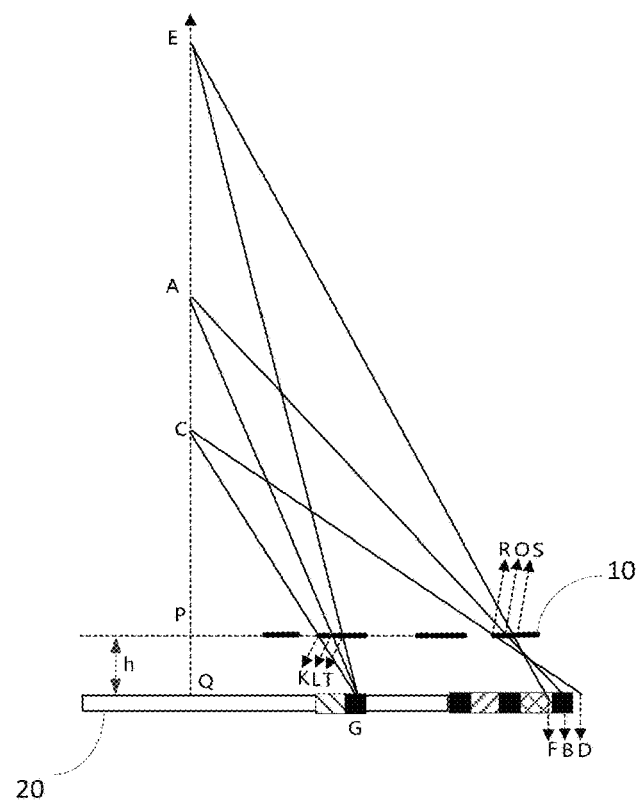
FIG. 5 is a schematic diagram showing a principle of determining a position of a first strip-shaped electrode according to an embodiment of the present disclosure.

It should be noted that, in FIG. 4 and FIG. 5, the point A represents an optimal viewing position of the left eye, the sub-pixel B is located at an edge of the display screen near the right eye; because, as the human eyes move forward and backward, an edge position at the display screen farthest from the left eye is a position where crosstalk first occurs.

As shown in FIG. 5, in the present embodiment, the first control unit further includes a second sub-control unit configured to, when RO or OS is the width of at least two strip-shaped electrodes, according to the first distance obtained by the first sub-control unit, obtain a grating driving parameter with the following formula:

$$PK = PL - KL;$$
$$QD = QB + BD;$$

-continued $$PT = PL + LT;$$

$$QF = QB + FB;$$

$$PL = m*w;$$

$$\frac{AP}{AP+h} = \frac{PL}{QG} = \frac{PO}{QB};$$

$$\frac{CP}{CP+h} = \frac{PK}{QG} = \frac{PR}{QD};$$

$$\frac{EP}{EP+h} = \frac{PT}{QG} = \frac{PS}{QF};$$

where "m" represents a position of an m-th grating unit in a direction from an edge of the grating to a center of the grating; "w" represents a width of the grating unit; a point L represents a position of the grating unit corresponding to a sub-pixel G on the display screen, which is viewed when the human eyes are at the point A; KL represents a width of at least one strip-shaped electrode; and LT represents a width of at least one strip-shaped electrode. It should be noted that the number of strip-shaped electrodes, which needs to be increased, in the grating unit corresponding to the crosstalk position, is not an integer but needing to be rounded, and thus there is an error, that is, as shown in FIG. 5, crosstalk regions still exist at positions of points F and D, i.e., FB and BD, but it can be ignored since the crosstalk regions is smaller than the width of one strip-shaped electrode.

When the grating is driven in a case that the current distance between the human eyes and the grating is outside the optimal viewing distance, if the number of grating units corresponding to the crosstalk position is not an integer, a rounding process is performed.

By means of the foregoing formulas, when human eyes are located at different positions, all positions where crosstalk occurs can be obtained; these crosstalk positions are superimposed; the corresponding grating units between two adjacent crosstalk positions form one grating part; and the strip-shaped electrodes corresponding to each grating part are independently driven, so that the grating parameters can be adjusted more flexibly and the wiring can be reduced to a certain extent. For example, for a strip-shaped electrode with a width in a range from 0.9 to 3 um and an optimal viewing distance of 300 mm, several values of the first distance are given in the table below.

| first distance (move forward) mm | second distance (move backward) mm |
|---|---|
| 290.954 | 309.626 |
| 282.437 | 319.89 |
| 274.405 | 330.858 |
| 266.8165 | 342.6037 |
| 259.6362 | 355.2138 |
| 252.8321 | 368.7873 |
| 246.375 | 383.439 |
| 240.24 | 399.302 |

Figure 6:
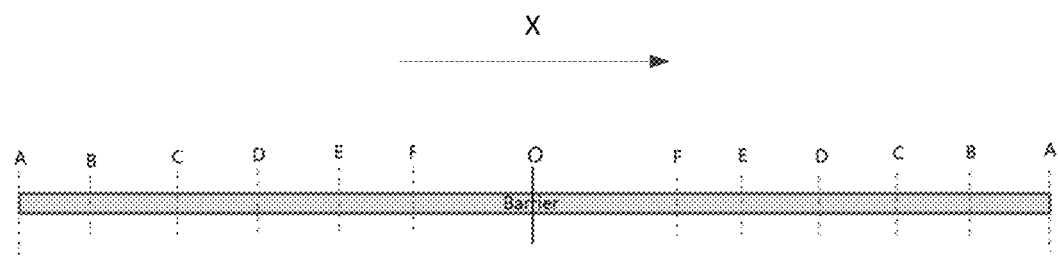
FIG. 6 is a first schematic diagram showing a crosstalk position on a grating according to an embodiment of the present disclosure.
Figure 7:
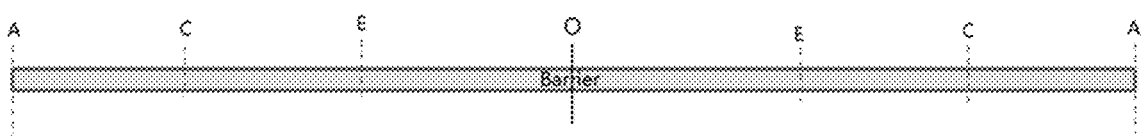
FIG. 7 is a second schematic diagram showing a crosstalk position on a grating according to an embodiment of the present disclosure.
Figure 8:
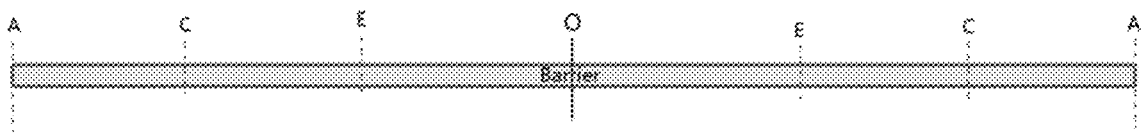
FIG. 8 is a third schematic diagram showing a crosstalk position on a grating according to an embodiment of the present disclosure.
Figure 9:
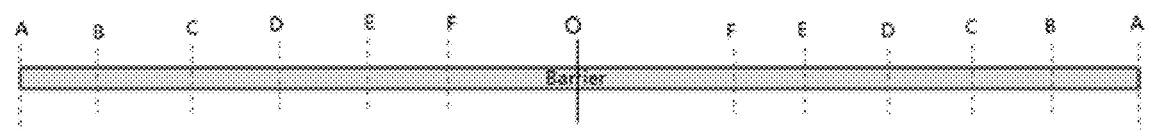
FIG. 9 is a fourth schematic diagram showing a crosstalk position on a grating according to an embodiment of the present disclosure.

FIG. 6 shows some crosstalk positions on the grating when the first distance is 399.302 mm, where the crosstalk positions including positions A, B, C, D, E, F. FIG. 7 shows some crosstalk positions on the grating when the first distance is 342.6037 mm, where the crosstalk positions including positions A, C, E. FIG. 8 shows some crosstalk positions on the grating when the first distance is 266.8165 mm, where the crosstalk positions including positions A, C, E. FIG. 9 shows some crosstalk positions on the grating when the first distance is 240.24 mm, where the crosstalk positions including positions A, B, C, D, E, F. Several regions of AB, BC, CD, DE, EF and FO are obtained by superimposing various positions. O represent a center of the grating. Left and right sides of the center of the grating are arranged symmetrically, then each of the various regions AB, BC, CD, DE and EF is corresponding to one grating part, and the number of grating units included in each grating part may be the same or different.

The grating is in a direction parallel to a direction of a line connecting centers of the human eyes. The grating units are symmetrically arranged with the center of the grating as the center. When a person moves back and forth in a direction perpendicular to the display screen, a width (referring to an X direction in FIG. 6) of a grating unit corresponding to the crosstalk position changes. When the person moves forward, the width of the grating unit corresponding to the crosstalk position becomes smaller by reducing the number of strip-shaped electrodes corresponding to the grating unit. Referring to FIG. 6 and FIG. 7, since the width of each strip-shaped electrode is in a range from 0.9 to 3 um, the width of the grating unit is reduced by an integer multiple of 1.5 um. Similarly, when the person moves backward, the width of the grating unit corresponding to the crosstalk position becomes larger by increasing the number of strip-shaped electrodes corresponding to the grating unit. Referring to FIG. 8 and FIG. 9, since the width of the strip-shaped electrode is in a range from 0.9 to 3 um, the width of the grating unit is increased by an integer multiple of 1.5 um.

The first distances are different, and the crosstalk positions are different. FIG. 6 shows crosstalk positions A, B, C, D, E and F, when the first distance is 399.302 mm. The farther the crosstalk position is away from the center of the grating, the more the number of strip-shaped electrodes that need to be increased or decreased for the grating unit at the crosstalk position. For example, in FIG. 6, the width of the grating unit at the point F needs to be increased by the width of 1 strip-shaped electrode; the width of the grating unit at the point E needs to be increased by the widths of 2 strip-shaped electrodes; the width of the grating unit at the point D needs to be increased by the widths of 3 strip-shaped electrodes; the width of the grating unit at the point C needs to be increased by the widths of 4 strip-shaped electrodes; the width of the grating unit at the point B needs to be increased by the width of 5 strip-shaped electrodes; and the width of the grating unit at the point A needs to be increased by the width of 6 strip-shaped electrodes. FIG. 7 shows crosstalk positions A, C, E when the first distance is 342.6037 mm. FIG. 8 shows crosstalk positions A, C, E when the first distance is 266.8165 mm. FIG. 9 shows crosstalk positions A, B, C, D, E, F when the first distance is 240.24 mm.

Figure 12:
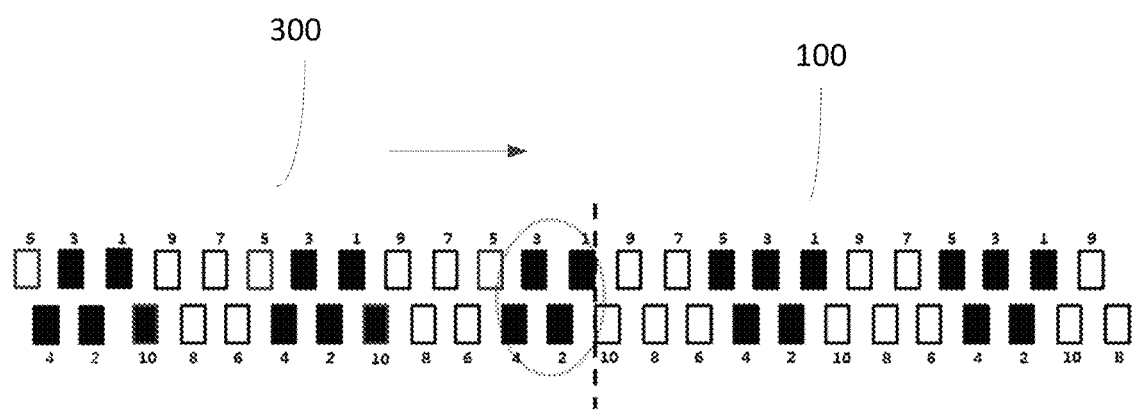
FIG. 12 is a second schematic diagram showing states of some strip-shaped electrodes after compensation according to an embodiment of the present disclosure.

FIG. 10 is a schematic diagram showing states of some strip-shaped electrodes corresponding to an optimal viewing distance according to an embodiment of the present disclosure. FIG. 11 is a schematic diagram showing states of strip-shaped electrodes at the right side of the center of the grating. FIG. 12 is a schematic diagram showing states of strip-shaped electrodes at the left side of the center of the grating. Comparing FIG. 10 with FIG. 11, no crosstalk occurs in a central region 100 of the grating and thus no compensation is needed. In a right-side region 200 located at the right side of the central region 100, a region corresponding to the strip-shaped electrode with the number 1 changes from a light shading part to a light transmission part, and a region corresponding to the strip-shaped electrode with the number 6 changes from a light transmission part to a light shading part. That is, the light transmission parts of the right-side region 200 of the grating is shift to the left, with reference to an arrow direction in FIG. 11. The number of strip-shaped electrodes, which are located near the central region 100 in the right-side region 200 and used to form the light transmission parts, is reduced by one (referring to an inner part of the circle). By comparing FIG. 10 with FIG. 12, no crosstalk occurs in the central region 100 of the grating and thus no compensation is needed. In a left-side region 300 located at the left side of the central region 100, a region corresponding to the strip-shaped electrode with the number 5 changes from a light shading part to a light transmission part, and a region corresponding to the strip-shaped electrode with the number 10 changes from a light transmission part to a light shading part. That is, the light transmission parts of the left-side region 300 of the grating is shift to the right, with reference to an arrow direction in FIG. 12. As shown in FIG. 12, the number of strip-shaped electrodes, which are located near the central region 100 in the left-side region 300 and used to form the light shading parts, is reduced by one.

Figure 13:
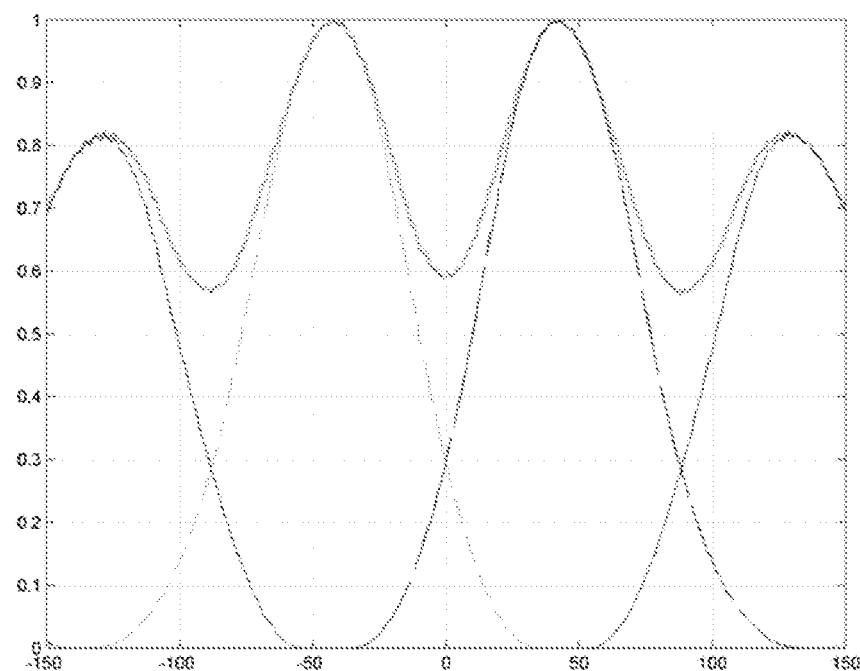
FIG. 13 is a schematic diagram showing a brightness curve of various viewpoints without electrode compensation.
Figure 14:
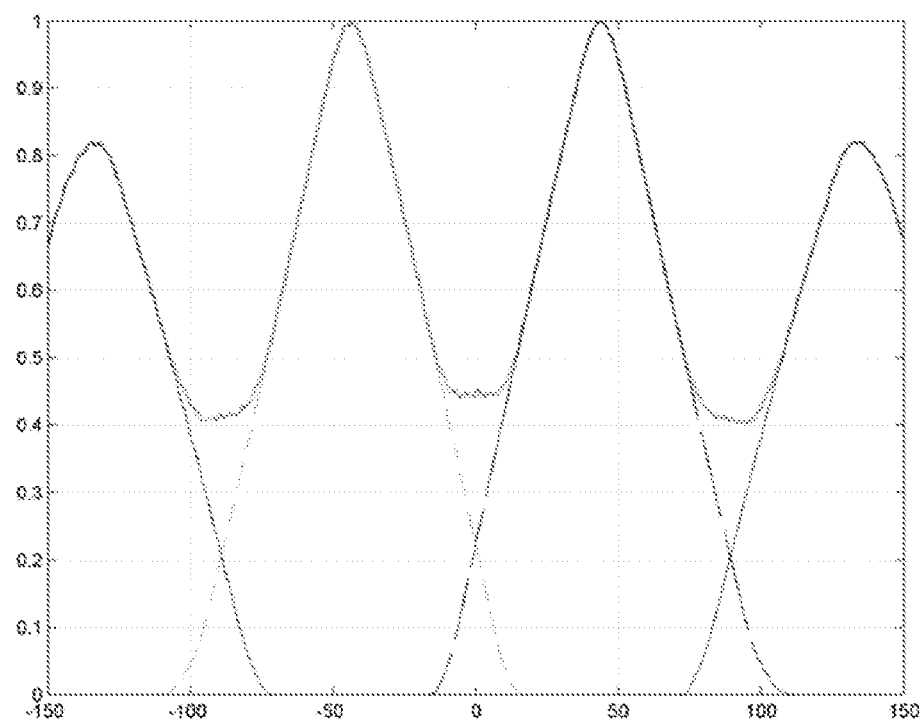
FIG. 14 is a schematic diagram showing a brightness curve of various viewpoints with electrode compensation.
Figure 15:
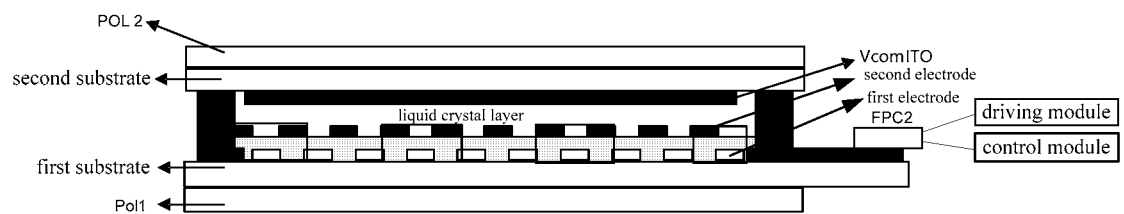
FIG. 15 is a schematic structural view of a grating according to an embodiment of the present disclosure.

FIG. 13 is a schematic diagram showing a brightness curve of various viewpoints without electrode compensation when the first distance is 399.302 mm; and FIG. 14 is a schematic diagram showing a brightness curve of various viewpoints with electrode compensation when the first distance is 399.302 mm, where horizontal coordinates represent the first distance, and vertical coordinates represent relative brightness. By comparing FIG. 13 with FIG. 14, it is apparent that after performing electrode compensation, a width of a brightness curve of each viewpoint becomes smaller, and crosstalk between curves becomes smaller.

In this embodiment, the grating can not only realize that when the human eyes move forward and backward relative to the display screen in the direction perpendicular to the display screen, the width of the grating unit corresponding to the crosstalk position is changed, so as to reduce the crosstalk to improve the 3D display effect, but also realize that when the human eyes move in the direction parallel to the line direction of the centers of the two eyes, the light transmission parts of the grating, as a whole, shift along with the movement direction of the human eyes, so as to reduce crosstalk to improve the 3D display effect.

The control module further includes:

a fifth control unit configured to determine an offset direction and an offset distance of the human eyes with respect to the optimal viewing position in a direction parallel to a line of centers of the human eyes; and a sixth control unit configured to, according to the offset direction and the offset distance of the human eyes, determine an offset direction and an offset distance of the light transmission part of the grating with respect to the position of the light transmission part when the human eyes are at an optimal viewing position.

The minimum offset distance of the offset distance is the width of one strip-shaped electrode.

One embodiment of the present disclosure provides a grating driving method, including:

obtaining a corresponding relationship between a grating driving parameter and a distance between human eyes and a grating; where the grating driving parameter includes a grating unit corresponding to a crosstalk position and the number of strip-shaped electrodes of the grating unit corresponding to the crosstalk position;

determining a current distance between the human eyes and the grating; when the current distance between the human eyes and the grating is outside an optimal viewing distance, according to the corresponding relationship and the current distance between the human eyes and the grating, obtaining a grating driving parameter corresponding to the current distance; and according to the grating driving parameter corresponding to the current distance, generating a corresponding driving signal for changing the number of strip-shaped electrodes of the grating unit corresponding to the crosstalk position.

In this embodiment, the obtaining a corresponding relationship between a grating driving parameter and a distance between human eyes and a grating, specifically includes:

obtaining a first distance that the human eyes are able to move in a direction perpendicular to the display screen with respect to the optimal viewing distance according to the following formulas:

the optimal viewing distance $$AP = h * \frac{PO}{QB - PO};$$

when moving to a point C close to the display screen in a direction perpendicular to the display screen, a distance between the human eyes and the grating 10 is $$CP = h * \frac{PR}{QB - PO};$$

when moving to a point C away from the display screen in a direction perpendicular to the display screen, a distance between the human eyes and the grating 10 is $$EP = h * \frac{PS}{QB - PO};$$

$$PR = PO - RO;$$

$$PS = PO + OS;$$

where "h" represents a distance between the grating and the display screen; a point P is an intersection point of an optimal viewing point A to a vertical line of the grating; a point O represents a position of the grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one strip-shaped electrode.

In this embodiment, the obtaining a corresponding relationship between a grating driving parameter and a distance between human eyes and a grating, further includes:

when RO or OS is the width of at least two strip-shaped electrodes, according to the first distance obtained by the first sub-control unit, obtaining a grating driving parameter with the following formula:

$$PK = PL - KL;$$

$$QD = QB + BD;$$

$$PT = PL + LT;$$

-continued $$QF = QB + FB;$$

$$PL = m * w;$$

$$\frac{AP}{AP+h} = \frac{PL}{QG} = \frac{PO}{QB};$$

$$\frac{CP}{CP+h} = \frac{PK}{QG} = \frac{PR}{QD};$$

$$\frac{EP}{EP+h} = \frac{PT}{QG} = \frac{PS}{QF};$$

where "m" represents a position of an m-th grating unit in a direction from an edge of the grating to a center of the grating; "w" represents a width of the grating unit; a point L represents a position of the grating unit corresponding to a sub-pixel G on the display screen, which is viewed when the human eyes are at the point A; KL represents a width of at least one strip-shaped electrode; and LT represents a width of at least one strip-shaped electrode.

In this embodiment, the grating driving method further includes:

determining an offset direction and an offset distance of the human eyes with respect to a reference position in a direction parallel to a line of centers of the human eyes; and determining an offset direction and an offset distance of the light transmission part of the grating with respect to the position of the light transmission part when the human eyes are at an optimal viewing position through the grating driving method in this embodiment, when a person moves left and right for viewing, the light transmission parts of the grating move along with the person to reduce crosstalk; and when the person moves forward and backward, the width of the grating unit corresponding to the crosstalk position is changed as needed to reduce crosstalk.

One embodiments of the present disclosure provides a 3D display device including a display screen and the foregoing grating at a light-exiting side of the display screen.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A grating, comprising:
a first substrate; wherein the first substrate comprises a first electrode layer and a second electrode layer stacked on the first electrode layer, each of the first electrode layer and the second electrode layer comprises a plurality of strip-shaped electrodes with an identical width, and the strip-shaped electrodes in the first electrode layer and the strip-shaped electrodes in the second electrode layer are arranged alternately;
a second substrate oppositely arranged with respect to the first substrate;
a liquid crystal layer between the first substrate and the second substrate;
a plurality of driving modules configured to drive the plurality of the strip-shaped electrodes to enable liquid crystals to be deflected to form light shading parts and light transmission parts; wherein a grating unit is defined by one light shading part and one adjacent light transmission part, a grating part is defined by at least one grating unit, the plurality of driving modules are arranged in one-to-one correspondence with the grating parts; and
a control module configured to generate a plurality of driving signals in one-to-one correspondence with the plurality of the driving modules according to a distance between the human eyes and the grating, thereby changing a width of the grating unit corresponding to a crosstalk position, and enabling each light transmission part in the grating part corresponding to the crosstalk position to move close to or away from a center of the grating,
wherein the control module comprises:
a first control unit configured to obtain a corresponding relationship between a grating driving parameter and a distance between human eyes and a grating; wherein the grating driving parameter comprises a grating unit corresponding to the crosstalk position and a width of the grating unit corresponding to the crosstalk position;
a second control unit configured to determine a current distance between the human eyes and the grating;
a third control unit configured to, when the current distance between the human eyes and the grating is outside an optimal viewing distance, according to the corresponding relationship and the current distance between the human eyes and the grating, obtain a grating driving parameter corresponding to the current distance; and
a fourth control unit configured to, according to the grating driving parameter corresponding to the current distance, generate a corresponding driving signal for changing a width of the grating unit corresponding to the crosstalk position, and moving each light transmission part in the grating part corresponding to the crosstalk position close to or away from a center of the grating,
wherein the first control unit includes a first control sub-unit configured to obtain a first distance that the human eyes are able to move in a direction perpendicular to a display screen with respect to the optimal viewing distance according to the following formulas:
the optimal viewing distance $$AP = h * \frac{PO}{QB - PO};$$

when moving to a point C close to the display screen in a direction perpendicular to the display screen, a distance between the human eyes and the grating is $$CP = h * \frac{PR}{QB - PO};$$

when moving to a point C away from the display screen in a direction perpendicular to the display screen, a distance between the human eyes and the grating 10 is $$EP = h * \frac{PS}{QB - PO};$$

PR=PO−RO;

PS=PO+OS, and wherein "h" represents a distance between the grating and the display screen; a point P is an intersection point of an optimal viewing point A to a vertical line of the grating; a point O represents a position of a grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one strip-shaped electrode.

2. The grating according to claim 1, wherein when the grating part includes at least two grating units, the strip-shaped electrodes at the same position in different grating units of the same grating part share an identical driving signal line.

3. The grating according to claim 1, wherein the first control unit further includes a second sub-control unit configured to, when RO or OS is a width of at least two strip-shaped electrodes, according to the first distance obtained by the first sub-control unit, obtain a grating driving parameter with the following formulas:

$$PK = PL - KL;$$

$$QD = QB + BD;$$

$$PT = PL + LT;$$

$$QF = QB + FB;$$

$$PL = m*w;$$

$$\frac{AP}{AP+h} = \frac{PL}{QG} = \frac{PO}{QB};$$

$$\frac{CP}{CP+h} = \frac{PK}{QG} = \frac{PR}{QD};$$

$$\frac{EP}{EP+h} = \frac{PT}{QG} = \frac{PS}{QF};$$

wherein "m" represents a position of an m-th grating unit in a direction from an edge of the grating to a center of the grating; "w" represents a width of the grating unit; a point L represents a position of a grating unit corresponding to a sub-pixel G on the display screen, which is viewed when the human eyes are at the point A; KL represents a width of at least one strip-shaped electrode; and LT represents a width of at least one strip-shaped electrode.

4. The grating according to claim 1, wherein the number n of the corresponding stripe-shaped electrodes in each grating unit is obtained by the following formulas:
a width W of the grating unit is obtained by the following formula:

$$W = \frac{H*N*P}{h*M};$$

$$h=p*H/L;$$

$$n=W/a;$$

wherein "a" represents a width of each strip-shaped electrode; "H" represents an optimal viewing distance between the human eyes and the grating; "h" represents a distance between the grating and the display screen; "N" represents the number of sub-pixels of the display screen; "P" represents a width of the sub-pixel; "M" represents the number of grating units; and "L" represents a pupillary distance.

5. The grating according to claim 1, wherein the width of each of the strip electrodes is in a range from 0.9 to 3 um.

6. The grating according to claim 1, wherein the control module further includes:
a fifth control unit configured to determine an offset direction and an offset distance of the human eyes with respect to the optimal viewing position in a direction parallel to a line of centers of the human eyes; and
a sixth control unit configured to, according to the offset direction and the offset distance of the human eyes, determine an offset direction and an offset distance of the light transmission part of the grating with respect to the position of the light transmission part when the human eyes are at the optimal viewing position.

7. A grating driving method applied to the grating according to claim 1, comprising:
obtaining a corresponding relationship between a grating driving parameter and a distance between human eyes and a grating; wherein the grating driving parameter includes a grating unit corresponding to a crosstalk position and a width of the grating unit corresponding to the crosstalk position;
determining a current distance between the human eyes and the grating;
when the current distance between the human eyes and the grating is outside an optimal viewing distance, according to the corresponding relationship and the current distance between the human eyes and the grating, obtaining a grating driving parameter corresponding to the current distance; and
according to the grating driving parameter corresponding to the current distance, generating a corresponding driving signal for changing a width of the grating unit corresponding to the crosstalk position, and moving each light transmission part in the grating part corresponding to the crosstalk position close to or away from a center of the grating.

8. The grating driving method according to claim 7, wherein the obtaining a corresponding relationship between a grating driving parameter and a distance between human eyes and a grating, further includes:
when RO or OS is a width of at least two strip-shaped electrodes, according to the first distance obtained by the first sub-control unit, obtaining a grating driving parameter with the following formulas:

$$PK = PL - KL;$$

$$QD = QB + BD;$$

$$PT = PL + LT;$$

$$QF = QB + FB;$$

$$PL = m*w;$$

$$\frac{AP}{AP+h} = \frac{PL}{QG} = \frac{PO}{QB};$$

$$\frac{CP}{CP+h} = \frac{PK}{QG} = \frac{PR}{QD};$$

-continued $$\frac{EP}{EP+H} = \frac{PT}{QG} = \frac{PS}{QF};$$

wherein "m" represents a position of an m-th grating unit in a direction from an edge of the grating to a center of the grating; "w" represents a width of the grating unit; a point L represents a position of a grating unit corresponding to a sub-pixel G on the display screen, which is viewed when the human eyes are at the point A; KL represents a width of at least one strip-shaped electrode; and LT represents a width of at least one strip-shaped electrode.

9. The grating driving method according to claim 7, further comprising:
determining an offset direction and an offset distance of the human eyes with respect to the optimal viewing position in a direction parallel to a line of centers of the human eyes; and
according to the offset direction and the offset distance of the human eyes, determining an offset direction and an offset distance of the light transmission part of the grating with respect to the position of the light transmission part when the human eyes are at the optimal viewing position.

10. A 3D display device, comprising: a display screen and a grating disposed at a light-exiting side of the display screen;
wherein the grating comprises:
a first substrate; wherein the first substrate comprises a first electrode layer and a second electrode layer stacked on the first electrode layer, each of the first electrode layer and the second electrode layer comprises a plurality of strip-shaped electrodes with an identical width, and the strip-shaped electrodes in the first electrode layer and the strip-shaped electrodes in the second electrode layer are arranged alternately;
a second substrate oppositely arranged with respect to the first substrate;
a liquid crystal layer between the first substrate and the second substrate;
a plurality of driving modules configured to drive the plurality of the strip-shaped electrodes to enable liquid crystals to be deflected to form light shading parts and light transmission parts; wherein a grating unit is defined by one light shading part and one adjacent light transmission part, a grating part is defined by at least one grating unit, the plurality of driving modules are arranged in one-to-one correspondence with the grating parts; and
a control module configured to generate a plurality of driving signals in one-to-one correspondence with the plurality of the driving modules according to a distance between the human eyes and the grating, thereby changing a width of the grating unit corresponding to a crosstalk position, and enabling each light transmission part in the grating part corresponding to the crosstalk position to move close to or away from a center of the grating,
wherein the control module comprises:
a first control unit configured to obtain a corresponding relationship between a grating driving parameter and a distance between human eyes and a grating; wherein the grating driving parameter comprises a grating unit corresponding to the crosstalk position and a width of the grating unit corresponding to the crosstalk position;
a second control unit configured to determine a current distance between the human eyes and the grating;
a third control unit configured to, when the current distance between the human eyes and the grating is outside an optimal viewing distance, according to the corresponding relationship and the current distance between the human eyes and the grating, obtain a grating driving parameter corresponding to the current distance; and
a fourth control unit configured to, according to the grating driving parameter corresponding to the current distance, generate a corresponding driving signal for changing a width of the grating unit corresponding to the crosstalk position, and moving each light transmission part in the grating part corresponding to the crosstalk position close to or away from a center of the grating,
wherein the first control unit includes a first control sub-unit configured to obtain a first distance that the human eyes are able to move in a direction perpendicular to a display screen with respect to the optimal viewing distance according to the following formulas:
the optimal viewing distance $$AP = h * \frac{PO}{QB-PO};$$

when moving to a point C close to the display screen in a direction perpendicular to the display screen, a distance between the human eyes and the grating is $$CP = h * \frac{PR}{QB-PO};$$

when moving to a point C away from the display screen in a direction perpendicular to the display screen, a distance between the human eyes and the grating 10 is $$EP = h * \frac{PS}{QB-PO};$$

$PR=PO-RO;$ $PS=PO+OS$, and wherein "h" represents a distance between the grating and the display screen; a point P is an intersection point of an optimal viewing point A to a vertical line of the grating; a point O represents a position of a grating unit corresponding to a sub-pixel B at an edge of the display screen, which is viewed when the human eyes are at the point A; a point Q is an intersection point of the point A to the vertical line of the display screen; RO represents a width of at least one strip-shaped electrode; and OS represents a width of at least one strip-shaped electrode.

11. The 3D display device according to claim 10, wherein when the grating part includes at least two grating units, the strip-shaped electrodes at the same position in different grating units of the same grating part share an identical driving signal line.

12. The 3D display device according to claim 10, wherein the first control unit further includes a second sub-control unit configured to, when RO or OS is a width of at least two strip-shaped electrodes, according to the first distance obtained by the first sub-control unit, obtain a grating driving parameter with the following formulas:

$$PK = PL - KL;$$
$$QD = QB + BD;$$
$$PT = PL + LT;$$
$$QF = QB + FB;$$
$$PL = m*w;$$
$$\frac{AP}{AP+h} = \frac{PL}{QG} = \frac{PO}{QB};$$
$$\frac{CP}{CP+h} = \frac{PK}{QG} = \frac{PR}{QD};$$
$$\frac{EP}{EP+H} = \frac{PT}{QG} = \frac{PS}{QF};$$

wherein "m" represents a position of an m-th grating unit in a direction from an edge of the grating to a center of the grating; "w" represents a width of the grating unit; a point L represents a position of a grating unit corresponding to a sub-pixel G on the display screen, which is viewed when the human eyes are at the point A; KL represents a width of at least one strip-shaped electrode; and LT represents a width of at least one strip-shaped electrode.

13. The 3D display device according to claim 10, wherein the number n of the corresponding stripe-shaped electrodes in each grating unit is obtained by the following formulas: a width W of the grating unit is obtained by the following formula:

$$W = \frac{H*N*P}{h*M};$$

$$h = p*H/L;$$

$$n = W/a;$$

wherein "a" represents a width of each strip-shaped electrode; "H" represents an optimal viewing distance between the human eyes and the grating; "h" represents a distance between the grating and the display screen; "N" represents the number of sub-pixels of the display screen; "P" represents a width of the sub-pixel; "M" represents the number of grating units; and "L" represents a pupillary distance.

14. The 3D display device according to claim 10, wherein the width of each of the strip electrodes is in a range from 0.9 to 3 um.

15. The 3D display device according to claim 10, wherein the control module further includes:
   a fifth control unit configured to determine an offset direction and an offset distance of the human eyes with respect to the optimal viewing position in a direction parallel to a line of centers of the human eyes; and
   a sixth control unit configured to, according to the offset direction and the offset distance of the human eyes, determine an offset direction and an offset distance of the light transmission part of the grating with respect to the position of the light transmission part when the human eyes are at the optimal viewing position.

\* \* \* \* \*